Inventors
H. GRAYSON -
R.A.G. DUNKLEY

Inventors
H. GRAYSON·
R.A.G. DUNKLEY·

By *Robert Harding jr.*
Attorney

United States Patent Office 2,770,739
Patented Nov. 13, 1956

2,770,739
TRIGGER CIRCUITS

Harry Grayson and Rowland Arthur George Dunkley, London, England, assignors to International Standard Electric Corporation, New York, N. Y.

Application February 15, 1954, Serial No. 410,394

Claims priority, application Great Britain February 17, 1953

7 Claims. (Cl. 307—88)

This invention relates to magnetic trigger circuits.

The main feature of the invention comprises a second-harmonic transformer arrangement capable of change-over from one output condition to a second output condition in response to the arrival at an input of an electrical pulse of relatively short duration.

The principal object of the invention therefore is to provide a trigger circuit which depends for its trigger action on a second-harmonic transformer.

Another object is to provide a pulse counting chain incorporating trigger circuits comprising second-harmonic transformers.

The invention will be described with reference to the accompanying drawings in which.

Figure 1:
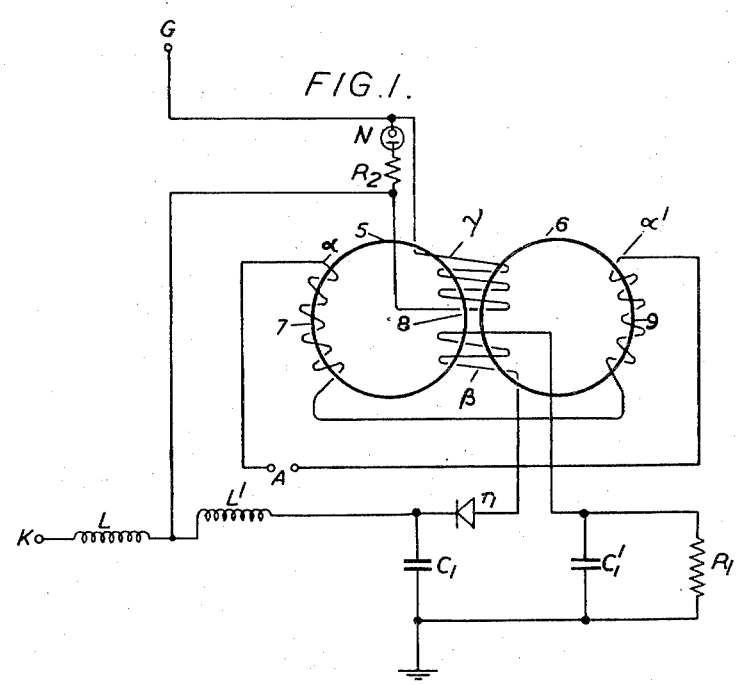
Fig. 1 shows a bi-stable trigger circuit.

Referring to Fig. 1, a bi-stable magnetic trigger circuit comprises basically a second harmonic transformer. This transformer may conveniently be of the construction described in the application, Serial No. 410,387, filed February 15, 1954. According to this construction the transformer comprises two annular cores 5 and 6 of rectangular cross-section formed from tape of a saturable magnetic material and constituting a three-limbed core. Two primary coils $\alpha$, $\alpha^1$ are wound in the same sense on the outer limbs 7 and 9 of this core. They are connected in series to a source A of alternating current of carrier frquency, for instance 50 kc./s.

Two secondary coils $\beta$ and $\gamma$ are wound on the common limb 8 of the three-limbed core. Since the primary coils $\alpha$, $\alpha^1$ are wound in the same sense the magnetic fluxes through the common member 8 of the three-limbed core, due respectively to the coils $\alpha$ and $\alpha^1$ will be opposed. Accordingly when alternating current flows in the primary windings $\alpha$, $\alpha^1$ there would ideally be no current induced in the secondary windings $\beta$ and $\gamma$. However, it is well known that if a direct current flux is superimposed upon the alternating flux, then even harmonics, predominately the second, of the alternating current frequency appear in the secondary windings.

One stable state of the device of Fig. 1 is therefore that in which only alternating flux is generated in the core-members, and that due to the alternating current applied at A. However, it is impossible to construct a device in which the two primary coils $\alpha$, $\alpha^1$ are perfectly balanced. There will therefore always be at least a low-level second harmonic frequency generated in the coils $\beta$ and $\gamma$. To prevent this signal being rectified the rectifier $r_1$ must be blocked. To this end a small positive standing bias potential (which will usually need to be of the order of 10 volts) is applied at the terminal G. The circuit then behaves effectively as if there were no induced current in the secondary windings. This will be referred to as the "off" state.

To switch the trigger circuit into the "on" state a positive potential greater than the standing bias at terminal G is applied momentarily at the terminal K. A pulse of current flows through the inductance L and the secondary winding $\gamma$ to G.

If desired the $\gamma$-winding may be shunted by a resistance $R_2$ and a neon lamp N to indicate when the $\gamma$-winding is energised. This indicating circuit has been shown in the drawing but is of course optional.

The current pulse in the $\gamma$-winding causes unbalance of the flux in the two cores and the level of the second-harmonic signal in the $\beta$-winding rises sufficiently to allow the rectifier $r_1$ to conduct. Thus, even though the original current pulse caused by the application of a positive potential to the terminal K has by now decayed, direct current rectified by the rectifier $r_1$ will energise the $\gamma$-winding via the inductance $L^1$. This direct current will in turn cause the generation of a higher level of second-harmonic in the $\beta$-winding. Thus by a cumulative process the other stable state, which will be referred to as "on" is established. This will be indicated by the discharge of the neon lamp N.

To return the circuit to its "off" condition it is merely necessary to interrupt the carrier supply instantaneously. The second-harmonic in the $\beta$-winding will disappear completely. No rectified current will then be fed back to the $\gamma$-winding to sustain the direct current bias so that when the alternating current supply is re-established in the primary windings $\alpha$, $\alpha^1$, only the low-level second-harmonic caused by unbalance appears. The rectifier is therefore blocked once again. The circuit could be made responsive to a negative triggering pulse applied at K simply by reversing the poling of the rectifier $r_1$.

In the remaining circuits to be described simplified circuit diagrams will be used. The simplications introduced will be explained with reference to Fig. 2. This drawing shows the simplified diagram of a trigger circuit identical with that of Fig. 1. In this diagram neither the cores 5 and 6 of saturable magnetic material nor the primary windings $\alpha$, $\alpha^1$ have been shown. However it is to be understood that both these elements are present and moreover, that the primary windings are energised from a source of alternating current of carrier frequency. By omitting the cores from the diagram it becomes possible to draw the secondary windings $\beta$ and $\gamma$ in any convenient position relative to the remaining circuitry.

Figure 3:
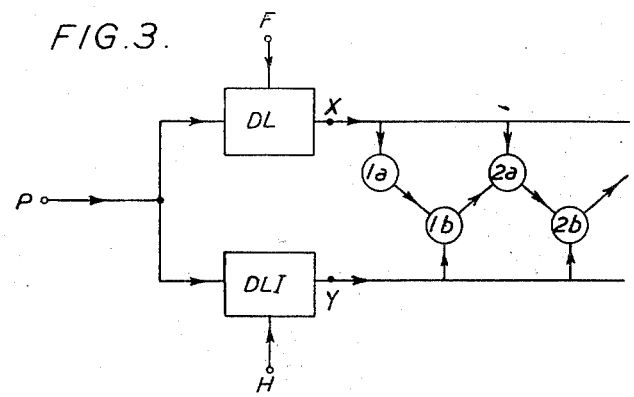
Fig. 3 shows schematically a counter employing trigger circuits of the type shown in Figs. 1 and 2.

The arrangement of a number of magnetic trigger-circuits to form a counter for pulses will now be described The basic principles of operation of the counter will first be described with reference to the block diagram of Fig. 3. In this diagram a frequency doubler DL and a doubler-inverter circuit DLI are both fed with alternating current of carrier frequency, $f$ say, at the inputs F and H respectively. Due to the second-harmonic amplifier effect alternating currents of frequency $2f$ are generated in the circuits DL and DLI. The input for the pulse-train to be counted is at P.

Figure 4:
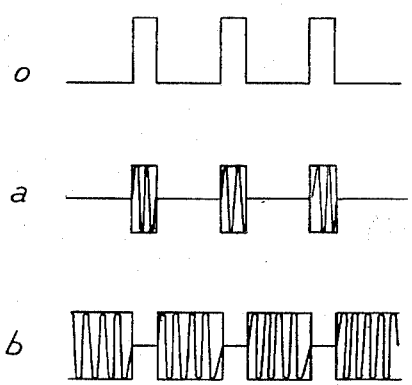
Fig. 4 shows three waveforms occurring in the circuit of Fig. 3.

The circuits DL and DLI will later be described in greater detail with reference to Fig. 5. It is sufficient at this point to remark that a second-harmonic signal of frequency $2f$ is transmitted by the doubler circuit DL only during the existence of a pulse of potential at the input P. On the other hand the doubler-inverter circuit transmits a second-harmonic signal only when there is no pulse at P. Referring to Fig. 4, the wave-form $o$ represents the pulse train to be counted which arrives at the input P. The wave-form $a$ is to output wave-form from the doubler circuit DL, and, has a pulse of alternating current corresponding to each pulse of the wave-form $o$. The wave-form $b$ represents the output from the doubler-inverter DLI. In this case a pulse of alternating current corresponds to the quiescent periods of the pulse-train to be counted, the wave-form $b$ being itself quiescent during each occurrence of a pulse at the input P. In the diagrams of the pulse trains $a$ and $b$ the rectangular outlines are of course merely diagrammatic, having been inserted to delineate the pulses.

Figure 2:
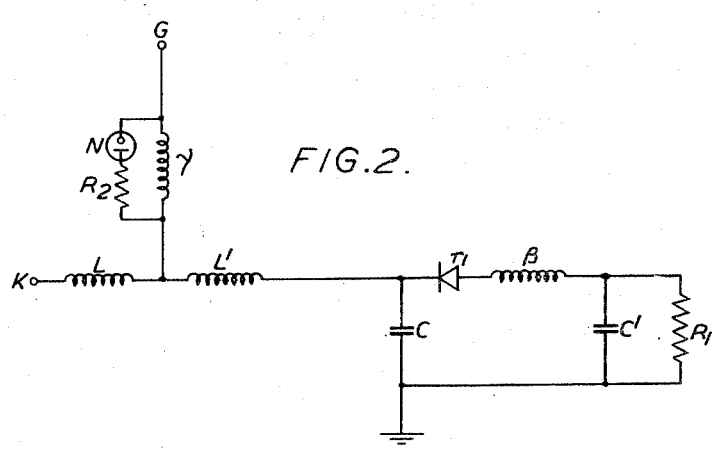
Fig. 2 is a simplified representation of the circuit of Fig. 1.

Referring again to Fig. 3 the elements $1a$, $1b$, $2a$, $2b$ are four of a number of trigger circuits of a type similar to that described with reference to Figs. 1 and 2. Suppose now that some starting signal is applied to the circuit $1a$ during the application of a pulse of potential to the input P, then that circuit will go into its "on" condition. This condition will persist until the decay of the pulse applied at P. As long as the circuit $1a$ is "on," an output is delivered to the next circuit $1b$. An arrangement is provided whereby this output persists for a short time after the decay of the input pulse at P. As soon as this input pulse has decayed, a pulse of alternating current of the waveform $b$ (Fig. 4) is applied to the circuit $1b$ which thus goes "on." This condition persists until the decay of the pulse P causes DLI to go "off" and DL to come "on" at which point $2a$ is triggered "on." In this way counting proceeds down the chain. There will always be one trigger circuit of the chain in its "on" condition. During the counting of a pulse that trigger circuit will be one of the $a$ series while during the quiescent state of the input pulse-train the active trigger circuit will be one of the $b$ series. To make a cyclic counter counting by $n$ it is merely necessary to arrange for the $nb$ element to trigger the $1a$ element.

The operation of the counter will now be described in detail with reference to Figs. 5 and 6 which show circuits simplified in the manner previously described. Since the doubler and doubler-inverter circuits DL and DLI are required to deliver current to a large number of trigger circuits they are required to deliver more power than the individual trigger circuits and so must usually be larger. In one practical case each switch had two annular cores each consisting of approximately 10 ft. of Permalloy 'C' tape ⅛" wide and .001 inch thick. The primary windings were divided as before, a half on each core. However, it was found to be convenient to arrange the secondaries also in two halves, one on each core instead of placing the two cores in close physical relationship in order to constitute a common limb as previously.

Figure 5:
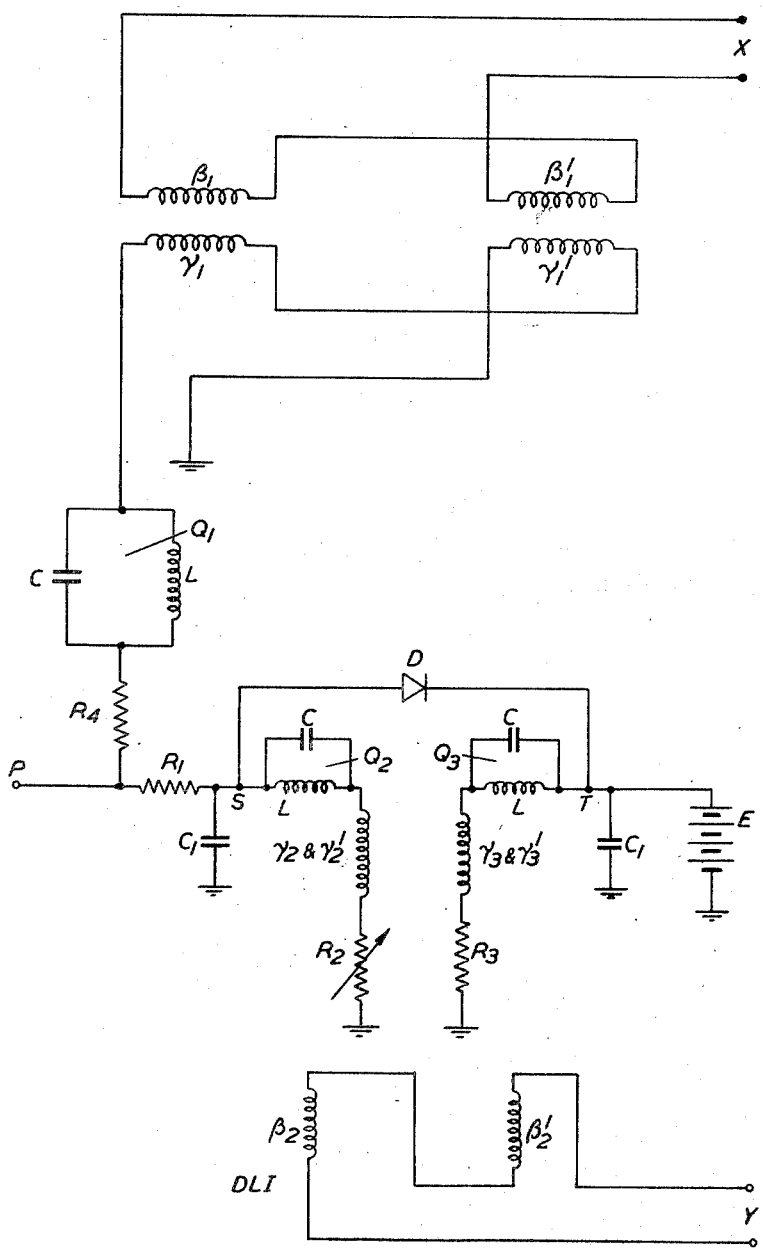
Fig. 5 shows in detail a part of the circuit shown schematically in Fig. 3.

Referring now to the upper part of Fig. 5 which shows the doubler circuit DL, the secondary windings each comprise two parts $\beta_1$, $\beta_1^1$ and $\gamma_1$, $\gamma_1^1$. The primary winding $\alpha_1$, $\alpha_1^1$ (not shown) is fed from a source of alternating current of frequency $f$. The coils $\alpha_1$, $\beta_1$ and $\gamma_1$ are all wound on one of the annular core-members described above, and the coils $\alpha_1^1$, $\beta_1^1$ and $\gamma_1^1$ on the other. As indicated in the diagram, the coils $\beta_1$ and $\beta_1^1$ are opposed and $\gamma_1$ and $\gamma_1^1$ are opposed so that the fundamental frequency $f$ and even harmonics thereof do not appear in the secondary windings.

The cores of the doubler inverter circuit DLI likewise each carry a part of the primary winding $\alpha_2$, $\alpha_2^1$ (not shown). These are also fed from a source of alternating current which is usually, but not necessarily of the same frequency $f$ as that feeding the winding $\alpha_1$, $\alpha_1^1$ of DL. The cores of DLI each carry three secondary windings $\beta_2$, $\beta_2^1$ and $\gamma_2$, $\gamma_2^1$ and $\gamma_3$, $\gamma_3^1$. The two parts of each of these secondary windings are opposed so that the fundamental frequency and odd harmonics thereof do not appear in them. In addition the two-windings are wound so as to produce fluxes in opposite directions in each of the annular cores.

When there is no pulse of potential at the pulse input P, the rectifier D is blocked by the potential of the battery E. At the same time direct current flows to earth via the $\gamma_3$-windings and the resistance $R_3$. The resultant direct current flux, superimposed upon the existing alternating current flux causes even harmonics, predominantly the second, of the fundamental frequency $f$ to appear in the secondary windings. The values of L and C in the circuits $Q_2$ and $Q_3$ are so chosen that those circuits tune to the second harmonic frequency $2f$; this frequency does not then leak into the remainder of the circuit. The second harmonic appearing in the $\beta$-winding is fed at Y to the $b$-stages of the counting chain.

The potential of the battery E is so chosen that when a pulse of the pulse-train to be counted ($o$ of Fig. 4) matures at P, the rectifier D conducts. This rectifier nevertheless ensures that the points S and T are held at equal potentials. Equal currents therefore flow through the secondary windings $\gamma_2$ and $\gamma_3$ to earth.

It has already been explained that these two windings are in opposition on each of the core-members. Accordingly no direct current flux is generated in either core-member. Any residual unbalance may be adjusted by means of the variable resistance $R_2$. In the absence of any direct current flux even harmonics are not induced in the secondary windings so there is no output at Y.

Meanwhile the existence of a positive pulse at P causes a direct current to flow to earth over the winding $\gamma_1$, $\gamma_1^1$ of DL. Accordingly a second harmonic output appears at X where it is fed to the $a$ stages of the counting-train. The circuit $Q_1$ is tuned to the second harmonic frequency $2f$ so that this does not appear in the remainder of the circuit.

Figure 6:
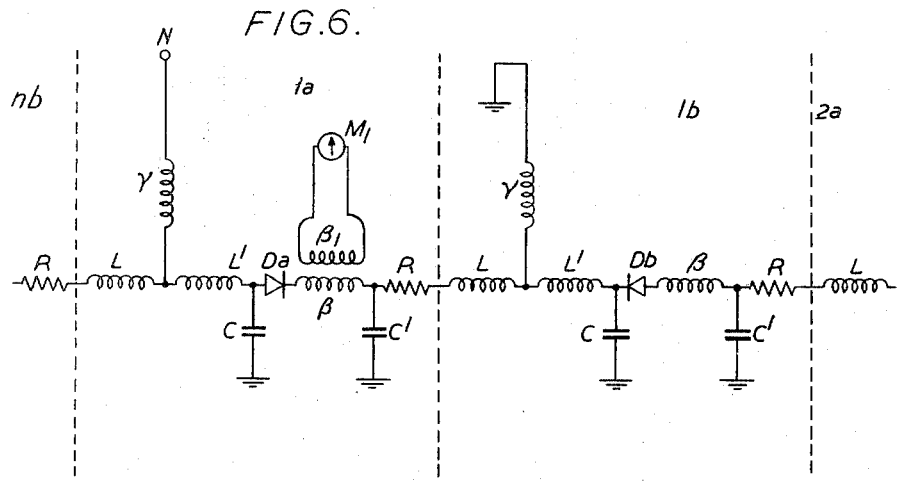
Fig. 6 shows in detail another part of the circuit shown schematically in Fig. 3.

Referring now to Fig. 6 the counting-train comprises $n$ identical $a$ stages, and $n$ identical $b$ stages. The $a$ and $b$ stages are similar to the circuits of Figs. 1 and 2 and differ from one another only in the poling of the rectifiers $D_a$ and $D_b$ and the connection of the $\gamma$-winding. In each of the $a$ stages the $\gamma$-winding is connected between the choke L—L$^1$ and a point N which is biassed to a small negative voltage, whereas in the $b$ stages the connection is between the choke and earth. The negative bias at N must, as previously described, be sufficient to block the rectifier $D_a$ so as to prevent rectification of the low-level second harmonic signal which appears in the $\beta$-winding when the stage is "off" due to unbalance in the primary windings $\alpha$. In addition to blocking the rectifier $D_a$, the negative bias at N of stage $1a$ also blocks the rectifier $D_b$ of stage $nb$. Similarly the rectifier $D_b$ of the stage $1b$ is blocked by the negative bias at N of stage $2a$.

The primary winding $\alpha$, $\alpha^1$ (not shown) of each of the $a$ stages is connected to the terminals X of Fig. 5, while the primary winding of each of the $b$ stages is connected to the terminals Y of Fig. 5

Consider now the arrival of a pulse of the pulse-train to be counted ($o$ of Fig. 4) at the input P (Fig. 5). A corresponding pulse of carrier appears at X and is applied to the primary windings of all $a$ stages. During the duration of this pulse the potential of the point N is lowered beyond its normal biassing values. This produces an effective current in the $\gamma$-winding. A significant level of the second harmonic frequency ($4f$) appears in the winding $\beta$, the rectifier is no longer blocked and by the cumulative process described earlier the "on" condition of this first stage is stabilised.

Meanwhile direct current flows through the $\gamma$-winding of stage $1b$ which does not of course come "on" since there is no carrier applied to its primary windings.

When the pulse applied at P decays the carrier supply to the $a$ stages ceases. However the condenser $C^1$ and the resistance R of stage $1a$ together with the inductance L of stage 1b produce sufficient delay to ensure that the current through the winding of stages 1b does not decay completely before the circuit DLI produces a second harmonic output to be fed to the b stages.

Transfer stage 2a occurs in an analogous fashion when the next pulse matures at P. The counting continues in this way until the arrival of the $(n+1)$th pulse causes the $nb$ stage to trigger the 1a stage into its "on" condition once more, the cycle then being complete.

In order to give an output for registration purposes an auxiliary $\beta$-winding is wound on the core of each of the $a$ stages. The auxiliary winding of the stage 1a is shown at $\beta_1$ in Fig. 6. Now, it will be remembered that the "on" stage of the stage 1a is characterised by an appreciable current in the $\beta$ winding. This current will induce a current in the auxiliary winding $\beta_1$ which is then used to operate a suitable registering device $M_1$. Each of the $a$ stages is provided with such a registering circuit so that the arrival of each pulse at the input P (Fig. 5) is registered.

In the case of a counter counting by ten, for instance, the tenth stage completes the cycle by triggering the first stage and in addition may be arranged to trigger the first stage of a decimal counted. The decimal counter then advances one stage for the completion of every cycle of the unit counter.

Figure 7:
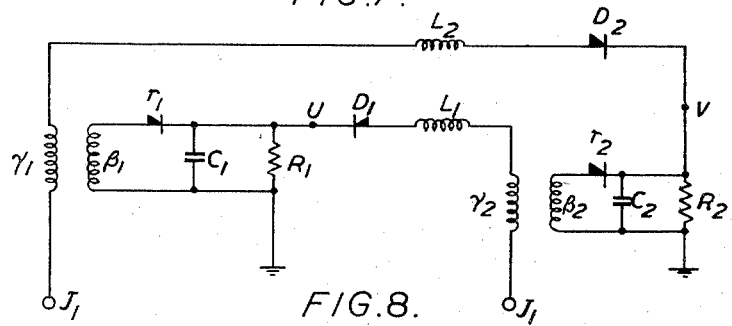
Fig. 7 shows a second form of bi-stable trigger circuit.

Referring to Fig. 7 another form of bi-stable circuit comprises two second-harmonic magnetic amplifiers. The circuit is in its simplified form, the annular cores and the primary windings not being shown. The primary windings are of course wound in such a way that the fundamental frequency applied to the primary windings and odd harmonics thereof, do not appear in the corresponding secondary windings.

Equal positive potentials are applied at $J_1$ and $J_2$. Similar direct current paths exist from each of these sources of potential to earth. In the case of the potential-source $J_1$, the path is over $\gamma_1$, the $\gamma$-winding of the first magnetic amplifier, the inductance $L_2$, the rectifier $D_2$ and the resistance $R_2$. In the case of the potential-source $J_2$ the path is over $\gamma_2$, the $\gamma$-winding of the second magnetic amplifier, the inductance $L_1$, the rectifier $D_1$ and resistance $R_1$. The current flowing in each $\gamma$-winding will cause the second harmonic of the carrier frequency to appear in the $\beta$-windings. These induced currents will be rectified by the rectifiers $r_1$ and $r_2$. The rectified currents will raise the potentials of the points U and V to values above those of the potentials applied at $J_2$ and $J_1$ respectively. There will thus be a tendency for the rectifiers $D_1$ and $D_2$ to be biassed so as to prevent the flow of direct current through the corresponding $\gamma$-windings $\gamma_2$ and $\gamma_1$. However, though the values of corresponding components on the two sides of the circuit are substantially equal there will in practice be variations which will cause the current through one of the $\gamma$-windings, $\gamma_1$ for instance, to be greater than that through the other. Thus upon switching on the carrier supplies and applying bias to the terminals $J_1$ and $J_2$ the circuit will be stabilized with amplifier 1 "on" and amplifier 2 "off," (i. e. current flowing in $\gamma_1$ and $D_1$ blocked). The condition of the circuit can be reversed by arranging for a current to flow momentarily in the winding $\gamma_2$. The resulting pulse of second-harmonic frequency in the winding $\beta_2$ raises the potential of the point V and so biases the rectifier $D_2$ to prevent direct current flowing through the winding $\gamma_1$ to earth. The change is then cumulative until the circuit becomes established in its second stable state with the first transformer "off" and the second "on."

Figure 8:
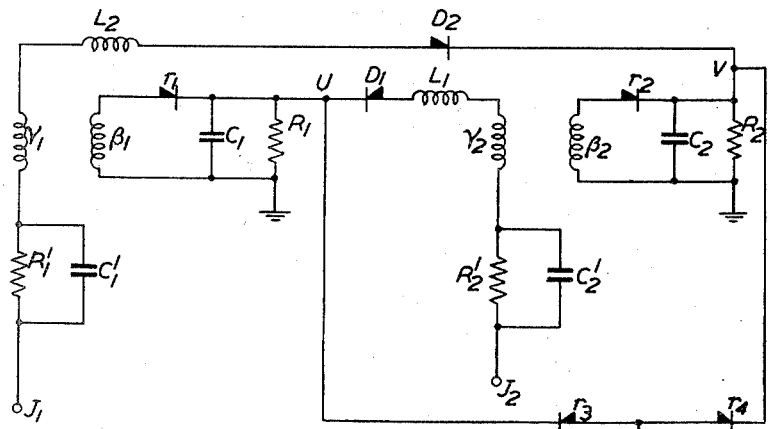
Fig. 8 shows a binary counting circuit employing the trigger circuit of Fig. 7.

Fig. 8 shows how the bi-stable circuit of Fig. 7 may be adapted to count narrow positive pulses of potential of amplitude approximately equal to the potential applied at the points $J_1$ and $J_2$. The circuit differs from that of Fig. 7 in that the potentials applied at $J_1$ and $J_2$ are fed to the $\gamma$-windings $\gamma_1$ and $\gamma_2$ over resistances $R_1^1$ and $R_2^1$ respectively, each shunted by a condenser, $C_1^1$ and $C_2^1$ respectively.

The pulses to be counted are applied at the terminal P and are fed to the points U and V through rectifiers $r_3$ and $r_4$.

Suppose that upon switching-on the carrier and direct current bias supplies that circuit stabilises with first transformer "on" and the second "off." The winding $\gamma_1$ will be passing current and there will therefore be a potential gradient over the resistance $R_1^1$. Accordingly the condenser $C_1^1$ will be charged.

As in the circuit of Fig. 7, the second harmonic of the carrier frequency will be induced in the winding $\beta_1$. This alternating current will be rectified at $r_1$ and will raise the potential of the point U to a value sufficient to block the rectifier $D_1$. No current can then flow through $R_2^1$ and $\gamma_2$ and the condenser $C_2^1$ will not receive any charge.

Upon the arrival at P of the leading edge of a pulse of potential of amplitude approximately equal to the potential applied at $J_1$ the rectifier $D_2$ will also become blocked. The current in winding $\gamma_1$ will cease and in consequence no further second harmonic current will be induced in $\beta_1$ and the potential of the point U will fall to that of the top of the pulse. Nevertheless the rectifier $D_1$ is still biased sufficiently to prevent current flowing from $J_2$ to earth. Meanwhile the condenser $C_1^1$ begins to discharge.

It is essential that the time-constant of the network $R_1^1 C_1^1$ is such as to ensure that the condenser does not discharge completely before the decay of the pulse being counted. At the trailing edge of the pulse the rectifiers $D_1$ and $D_2$ are both momentarily conductive. However the effect of the discharge current of the condenser $C_1^1$ is to reduce the total current flowing through the $\gamma_1$-winding. The current through this winding is therefore less than that through the $\gamma_2$-winding. In consequence, a higher level of second harmonic current is induced in the $\beta_2$-winding than in the $\beta_1$-winding and the blocking of the rectifier $D_2$ will be more effective than the blocking of the rectifier $D_1$. By the usual cumulative effect the second transformer comes "on" while the first is driven "off." The condition of the circuit has therefore been reversed by the application of a pulse at P.

The choice of the biassing potential applied at $J_1$ and $J_2$ will of course depend upon the amplitude of the pulses counted, while the values of the resistances $R_1^1$ and $R_2^1$ and the condensers $C_1^1$ and $C_2^1$ will be determined by the pulse-width.

The circuit may be readily adapted to count negative pulses by reversing the poling of each of the rectifiers and biasing $J_1$ and $J_2$ negative instead of positive.

Although the invention has been described with reference to an embodiment employing second-harmonic transformers constructed according to the method described in the application referred to above, other second harmonic transformer devices could of course equally well be employed.

While the principles of the invention have been described above in connection with specific embodiments, and particular modifications thereof, it is to be clearly understood that this description is made only by way of example and not as a limitation on the scope of the invention.

What we claim is:

1. A trigger circuit comprising a single second-harmonic transformer having a primary winding and first and second secondary windings, a first input connected to said primary winding and adapted to have alternating current applied thereto, a second input connected to said first secondary winding and adapted to have pulses of relatively short duration applied thereto, an output connected to said second secondary winding, said second secondary winding adapted to provide a path for an alternating current of a frequency which is an harmonic derivative of said alternating current applied to said first input, a feed-back circuit connected from said second secondary winding to said first secondary winding for passing current therebetween the produce a condition of sustained output, and means for interrupting said alternating current in said primary winding to produce a condition of no output.

2. A magnetic counting circuit comprising a counting input circuit adapted to receive electrical pulses of relatively short duration to be counted, a first plurality of second-harmonic transformer arrangements, a second plurality of second-harmonic transformer arrangements, each of said second-harmonic transformer arrangements comprising a single second-harmonic transformer having a primary winding and first and second secondary windings, a first input connected to said primary winding and adapted to have alternating current applied thereto, a second input connected to said first secondary winding and adapted to have pulses of relatively short duration applied thereto, an output connected to said second secondary winding, said second secondary winding adapted to provide a path for an alternating current of a frequency which is an harmonic derivative of said alternating current applied to said first input, a feed-back circuit connected from said second secondary winding to said first secondary winding for passing current therebetween to produce a condition of sustained output, and means for rectifying current in said output, means for applying an alternating current to the first input of each of said first plurality of second-harmonic transformer arrangements in response to the arrival of a pulse to be counted at said counting input, means for applying an alternating current to the first input of each of said second plurality of second-harmonic transformers when there is no pulse at said counting input, and means for applying the rectified current in the output of each of said second-harmonic transformer arrangements to the second inputs of respective transformer arrangements of the other plurality of transformer arrangements, the order of transfer being from the first arrangement of the first plurality to the first arrangement of the second plurality, from the first arrangement of the second plurality to the second arrangement of the first plurality, and so on, whereby the arrival of pulses at said counting input is represented by a sustained output from successive transformer arrangements of said first plurality.

3. A magnetic counting circuit, as claimed in claim 2, in which means are provided for applying the output of the last one of said second plurality of second-harmonic transformer arrangements to the second input of the first one of said first plurality of second-harmonic transformer arrangements.

4. A bistable trigger cihcuit comprising first and second single second-harmonic transformers each having a primary winding and first and second secondary windings, a first input connected to said primary winding and adapted to have alternating current applied thereto, a second input connected to said first secondary winding and adapted to have pulses of relatively short duration applied thereto, an output connected to said second secondary winding, said second secondary winding adapted to provide a path for an alternating current of a frequency which is an harmonic derivative of said alternating current applied to said first input, a feed-back circuit connected from said second secondary winding to said first secondary winding for passing current therebetween to produce a condition of sustained output, means for causing current in the output of said first second-harmonic transformer to prevent current from flowing in the second input of said second-harmonic transformer, and means for causing current in the output of said second second-harmonic transformer to prevent current from flowing in the second input of said first second-harmonic transformer.

5. A bistable trigger circuit, as claimed in claim 4, in which the means to prevent a current flowing in the inputs of the first and second transformers comprises in each case means for rectifying the current in the output and a rectifier in the circuit of the first input adapted to be blocked by the rectified output from the other transformer.

6. A binary counting circuit, as claimed in claim 5, further comprising a single pulse input and means responsive to the arrival of a pulse at said single pulse input for driving each of said transformers into a condition of no output, and in which each of said transformers is provided with electrical storage means connected to the second input, whereby the one of said transformers which was initially in a condition of sustained output is inhibited from returning to that state by the charge stored by the associated storage-means.

7. A binary counting circuit, as claimed in claim 6, in which said electrical storage means are condensers.

References Cited in the file of this patent

UNITED STATES PATENTS

| | | |
|---|---|---|
| 2,519,513 | Thompson | Aug. 22, 1950 |
| 2,640,164 | Gill et al. | May 26, 1953 |
| 2,652,501 | Wilson | Sept. 15, 1953 |
| 2,654,080 | Browne | Sept. 29, 1953 |